Nov. 14, 1950  W. C. SILVA  2,529,515
CELERY HARVESTER
Filed Sept. 5, 1945  3 Sheets-Sheet 1
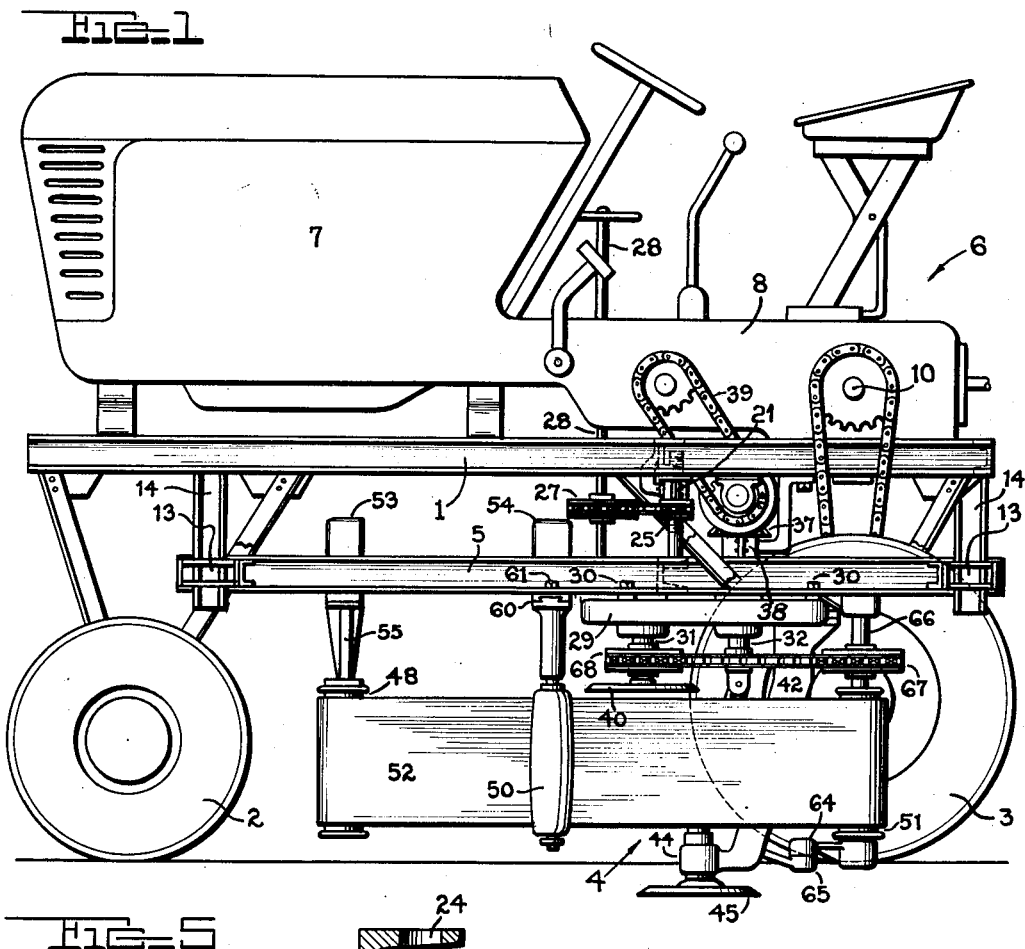
INVENTOR.
W. C. Silva
BY
Mason Fenwick & Lawrence
ATTORNEYS

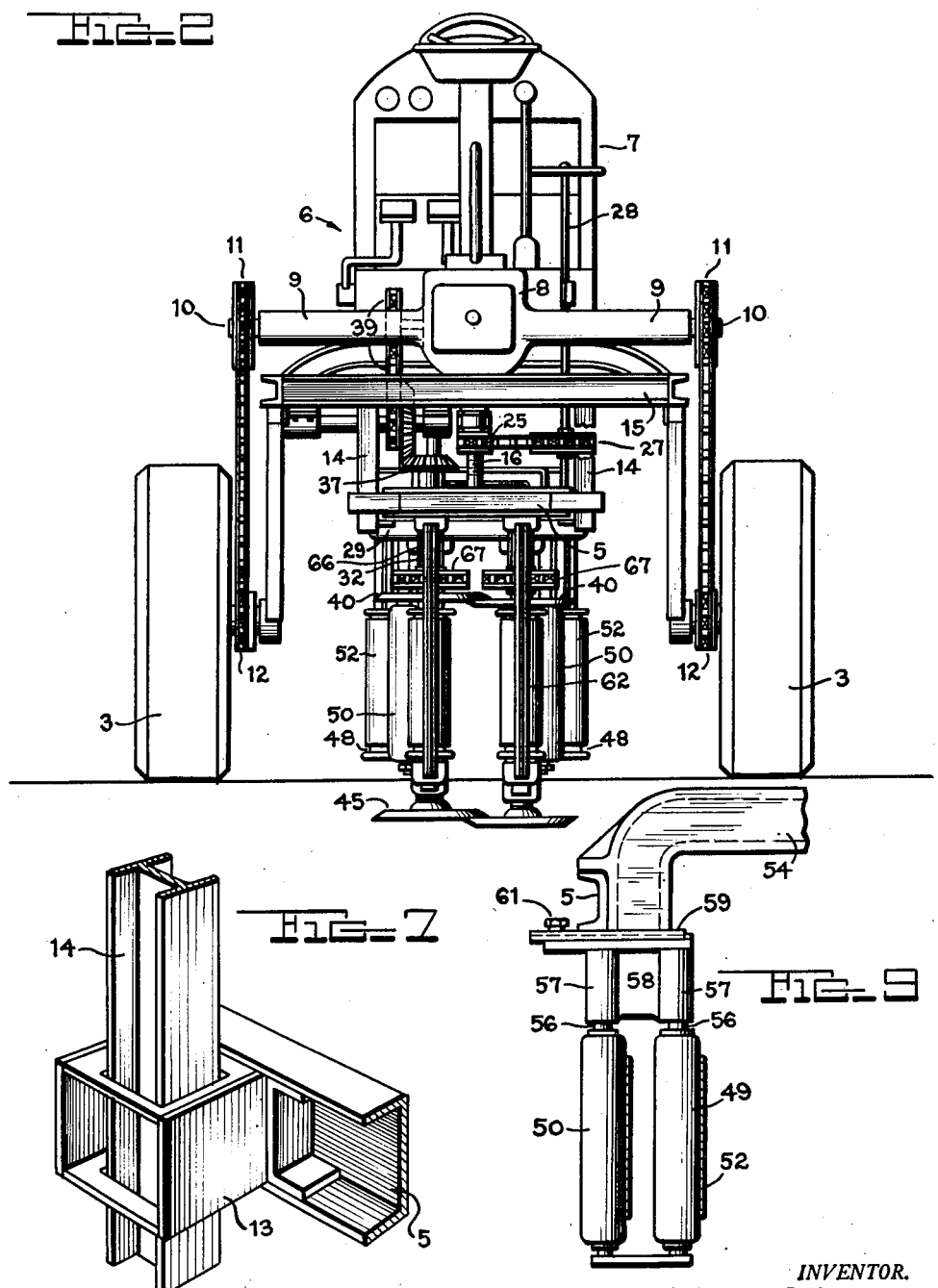

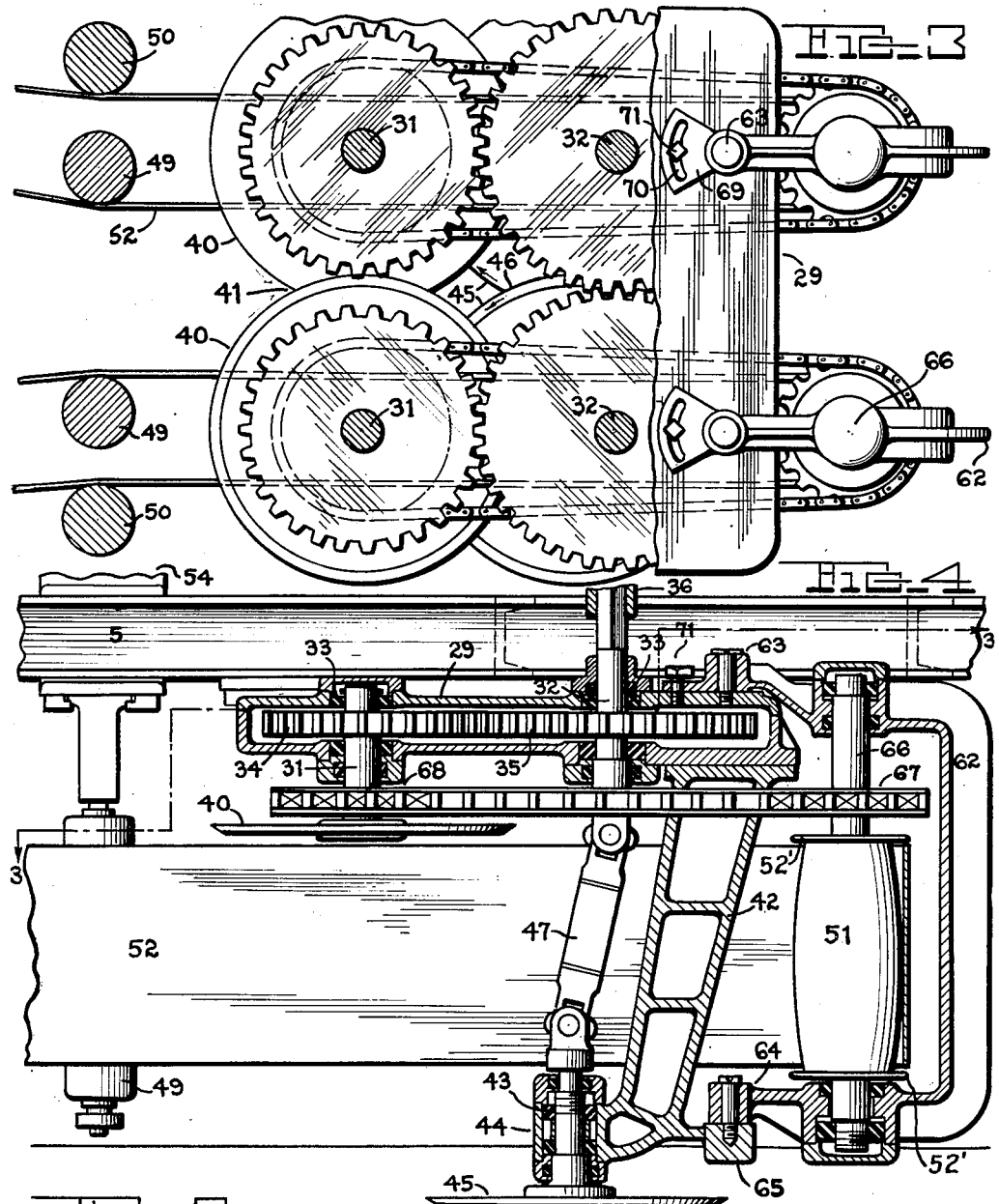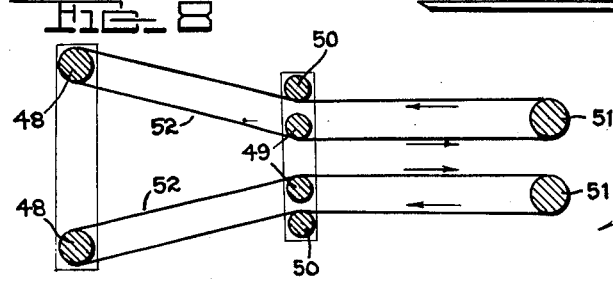

Patented Nov. 14, 1950

2,529,515

UNITED STATES PATENT OFFICE 2,529,515

CELERY HARVESTER

Willard C. Silva, Sarasota, Fla.

Application September 5, 1945, Serial No. 614,498

8 Claims. (Cl. 55—107)

This invention relates to celery harvesters and is an improvement upon the celery harvester forming the subject of my pending application Serial No. 535,729 now Patent 2,436,831.

That harvester is designed to be drawn along a row of standing celery. It has root cutting and top cutting means operable in cutting planes at different levels at a constant distance apart for producing trimmed celery stalks of uniform length to fit a standard crate, the root cutting and top cutting means being adjustable as a unit in a depthwise direction to regulate the depth of the root cutting means without changing the length of the cut stalks. The top cutting means are in advance of the root cutting means so that the tops are cut while the celery is still root-supported, and the harvester is provided with means for compacting the foliage portion of the celery plant in advance of the top cutting means.

The present invention embodies the same general inventive concept, with improvements in the instrumentalities, their arrangement and mode of operation.

One of the objects of the invention is the novel combination of a celery harvester and tractor.

Another object relates to improvement in the driving trains of the several movable instrumentalities and their means of support.

A further object of the invention resides in the relative direction of rotation of the root and top cutting means.

Other objects will appear as the following description of a preferred and practical embodiment of the invention proceeds.

In the drawings:

Figure 1 is a side view, partly broken away, showing the combination of celery harvester and tractor;

Figure 2 is a rear end view;

Figure 3 is a horizontal section taken along the line 3—3 of Figure 4;

Figure 4 is a vertical longitudinal section through the celery harvester, the forward portion being omitted;

Figure 5 is a view in elevation of the depth adjusting jack, the associated frame members being shown in section;

Figure 6 is an axial section through the jack nut;

Figure 7 is a perspective view, parts being in section, showing one of the guide blocks and slides;

Figure 8 is a view along in a horizontal plane, and largely diagrammatic, showing the orbits of the belts which define the celery passage;

Figure 9 is a vertical transverse elevation showing the laterally adjustable pair of rollers, by means of which the width of the throat of the celery passage is determined and varied.

Referring now in detail to the drawings, and first adverting to Figure 1, the numeral 1 represents a rectangular frame suitably supported upon the wheels 2 and 3, at such distance from the ground as to permit the celery harvester 4, which includes the sub-frame 5, to be suspended beneath the frame 1 with sufficient clearance to permit a depth adjustment of the celery harvester of at least four inches.

The frame 1 supports the tractor unit 6, which is of general conventional construction, consisting of an engine compartment 7 and a casing 8, to the rear, enclosing the clutch, transmission and differential. The tractor unit provides power for driving the tractor and operating the celery harvester.

Figure 2 shows that that part of the casing 8 which is devoted to the differential extends laterally to form shaft housings 9, through which extend the driven shafts 10. On the exposed ends of the driven shafts 10, are the sprockets 11 which are chain connected to the sprockets 12, by means of which the traction wheels 3 are driven. The traction wheels 3, as well as the brackets which support the sprockets 12, straddle the celery harvester, which extends in a forward direction beneath the tractor.

The sub-frame 5, which forms part of the celery harvester unit, is preferably rectangular and has at its four corners the guide blocks 13, one of which is shown in detail in Figure 7, and which slide along vertical guide posts 14 rigidly secured to cross members, one of which is shown at 15 in Figure 8. The guide blocks 13 make a neat sliding fit with the guide posts, preventing canting of the frame 5 and the guide posts are of sturdy rigid construction, capable of resisting without movement, any longitudinal or lateral strains transmitted by the celery harvester.

The sub-frame 5 is adjustable up or down along the guide posts 13 by a jack mechanism shown in Figures 1 and 2, and in larger detail in Figure 5. This comprises a jack screw 16, which as shown, passes through the central part of a cross member 17 of the sub-frame 5, this cross member being preferably located substantially above the center of gravity of the celery harvester. The jack screw may be secured in any suitable manner. In Figure 5 it is shown with a head 18 beneath the cross member 17 and welded thereto. The threaded shank 19 of the jack screw passes through the threaded bore of a nut 20, shown in detail in Figure 6, and which is supported in a divided bearing 21, carried by a bracket 22, secured to a cross member 23 of the main frame 1. The cross member 23, as shown, is a channel beam having holes 24 in its webs, in alignment with the jack screw, to permit the unobstructed longitudinal movement of the jack screw.

The lower end of the jack nut 20 is formed with a sprocket 25, connected by a chain 26 with a sprocket 27 on the shaft 28 of a hand wheel. By operation of the hand wheel the jack screw may be raised or lowered, lifting the frame 5, or letting it down. In practice, about four inches of movement is the maximum range found necessary for adjusting the depth of the celery harvester.

Referring now particularly to Figures 1, 2 and 4, the celery harvester includes a gear case 29, having brackets 30, at its four corners, by means of which it is bolted to the under side of the sub-frame 5. The gear case supports a pair of laterally spaced vertical shafts 31 adjacent its forward end, and a pair of laterally spaced vertical shafts 32 adjacent its rear end. These shafts are journaled in suitable axially aligned bearings 33 mounted in opposite walls of the case. Each of these shafts carries a gear, within the case, the forward shafts 31 carrying the gears 34 and the rearward shafts 32 having the gears 35. The gears 35 are in mesh with one another, and each is in mesh with one of the respective gears 34, but the gears 34 are smaller than the gears 35, and not in mesh with one another. One of the shafts 32, as shown in Figures 1, 2 and 4, extends upwardly beyond the case 29 and has a spline connection with a sleeve 36 carried by a gear 37, journaled in a bracket 38, mounted on the main frame 1. The length of the telescopic connection between the shaft 32 and the sleeve 36 is sufficient to keep these members connected throughout the range of depth adjustment of the celery harvester. The gear 37 is an element of a gear set driven by a chain and sprocket connection 39, from the power shaft of the tractor.

At the lower end of the shafts 31 are the rotary top cutters 40, which lap as shown in Figure 3, defining the forward cutting angle 41.

Assuming that the direction of rotation of the drive shaft 32 is counterclockwise, as indicated by the arrow in Figure 3, the forward peripheral portions of the top cutting disks 40 travel toward one another, drawing the bushy part of the celery toward the apex of the angle 41.

A pair of downwardly extending laterally spaced struts 42 are secured to the gear case 29, each of which supports a bearing 43 at its lower end. Vertical stub shafts 44 are journaled in the bearings 43, each carrying at its lower end a root cutting disk 45. The root cutting disks are of such diameter as to overlap, as indicated at 46 in Figure 3. The lower ends of the shafts 32 and the upper ends of the stub shafts 44 are connected by a universal joint constituted by a shaft section 47, pivotally joined to the respective upper and lower shafts. The provision of this universal connection is incident to the particular forward position of the stub shafts 44, relative to the shafts 32, and is not essential to the invention if the lower shafts were in axial alignment with the upper shafts.

Normally, the root cutting disks operate at a level beneath the ground, so that it is desirable that their forward cutting edges should travel away from one another, to avoid their becoming jammed by rocks entrained between their cutting edges. Since the gears 35 are directly enmeshed and the drive shaft 32 rotates clockwise, the forward portions of the cutting edges of the disks 45 travel away from one another.

The depth adjustment of the cutting disks 45 is controlled by the bodily lifting or depressing of the entire celery harvester unit by means of the jack screw, as hereinbefore described. Since the gear case 29 which carries the top cutting disks 40 and the struts 42 which carry the root cutting disks 45 are a unitary rigid structure, the depth distance between the top cutting disks and root cutting disks remains constant, regardless of the depth to which the root cutting disks may be adjusted. This assures the trimming of celery stalks to a constant length. The celery harvester is so designed that the depth distance between the top and root cutting disks trims the celery stalks to the proper length to fit into a standard crate, without the necessity of further trimming.

The celery in the field is quite a bushy plant, so that it is essential that the foliage portion be compacted into a dense mass by the time it reaches the top cutting disks. This assures that substantially all of the foliage branches will be in substantially vertical position at the time of cutting, which is necessary in order that the trimmed stalk shall be of the proper length. It is also essential that the entire stalk shall be in upright position when the top is cut, for if the celery stalk is in inclined position it will be trimmed to a length longer than depth distance between the top and root cutters.

In order to compact the foliage portion of the celery in advance of the top cutters, belt means are provided, defining a passage through which the celery must travel as the harvester is drawn along the row, progressively narrowing as it approaches the top cutters. From the point at which the tops are cut, to the discharge end of the harvester, the belts may run parallel, defining a passage of uniform width, but which is adjustable in width according to the robustness of the plants, and also adjustable to provide some convergence toward the rear, if desired, to more effectively discharge the trimmed stalks at the rear of the harvester.

Belt supporting means are provided, comprising the widely spaced vertical pulleys 48, toward the front of the sub-frame 5, defining the mouth of the celery passage, intermediate vertical pulleys 49 and 50, in transversely spaced pairs, the adjacent pulleys 49 defining the width of the throat of the celery passage just in advance of the top cutting disks, the outside pulleys 50 of each pair acting as direction changers to bring the outside flights of the belts into approximate parallelism with the inner flights, and a pair of spaced vertical pulleys 51 defining the discharge end of said passage. The belts 52 pass about the pulleys in the manner shown diagrammatically in Figure 8. The pulleys preferably have the shape of the pulley 51, illustrated in Figure 4, being convex so as to sustain the belts in mid position while revolving. The pulleys are preferably provided with flanges 52' at their lower ends to support the belts, should they tend to drop gravitationally when not revolving.

The forward and intermediate pulleys are supported upon the respective cross bars 53 and 54, which form part of the sub-frame 5. The forward pulleys 48 are carried by shafts or rods 55, which depend vertically from the cross bar 53. The pulleys 49 and 50 of each pair of intermediate pulleys are fixed to shafts 56 journaled in bearings 57 in a block 58 mounted to slide transversely in a guide 59 on the cross bar 54. The sliding block 58 and guide 59 are connected by a dovetail-shaped tongue 60, on the former, fitting a correspondingly shaped track in the latter. A set screw 61 secures the block 58 in any transverse position of adjustment.

The pulleys 51 at the discharge end of the celery passage are carried by spaced vertically hinged frames 62, each of which swings about an upper pivot 63, fixed to the gear case 29 and about a lower pivot 64, fixed to an extension 65 of one of the struts 42. The pulleys 51 are mounted on vertical shafts 66, carried in bearings in the upper and lower limbs of the frames 62. The shafts 66 carry sprockets 67, chain driven from sprockets 68 on shafts 31 of the top cutting disks. Thus, power is applied to the pulleys 51 to drive the belts 52. The direction of revolution of the belts is as shown in Figure 8, that of the inner flights being toward the rear of the celery harvester. The driving speed is preferably such as to cause the inner flights of the belt to move rearwardly at the same speed as the forward speed of the tractor, so that the ground speed of any point on the inner flights of the belts is practically zero. Thus, the movement of the belts engaging the celery has no effect in tilting the celery, which remains upright in its travel through the celery passage.

The hinged frames 62, which carry the rear pulleys 51, are each provided with an extension 69, forward of the upper pivot 63, having a flat lower face contacting a correspondingly flat portion of the gear case 29, the contacting interface being perpendicular to the axis of swing. The extensions 69 are each provided with an arcuate slot 70, concentric with the pivot 63, and underlying said slot is a threaded hole in the gear case. A headed stud 71 plays in said slot and is screwed into said hole, and can be guided down against the extension to fix the frame 62 in adjusted position. By this means the width of the discharge of the celery passage can be adjustably varied. This adjustment is generally made in correlation with the adjustment of the intermediate pulleys 49, to keep the width of the celery passage parallel between the intermediate and posterior pulleys. Upon occasion, the rear pulleys may be adjusted to give some rearward convergence to the celery passage, to prevent the stalks after the root has been cut, from toppling, and to effect positive ejection of the celery stalks to the rear of the harvester.

In operation, the width of the celery passage from the intermediate to rear pulleys is adjusted according to the bushiness of the plants. The jack screw is then operated to raise or lower the harvester to set the root cutting disks at the proper level according to the depth of planting. Then the tractor is drawn along the row with the celery harvester astride the row. The bushy foliage portion is embraced between the belts at the divergent front end of the celery passage and as the tractor proceeds, the foliage branches are brought together and compacted at the throat of the celery passage in front of the top cutting disks, the celery being still rooted in the ground and maintained upright, due to the lack of movement of the inner belt flights relative to the ground. While the celery is in this upright and root supported condition, the top is cut off and a moment later the root is severed by the root cutting disks. The severed stalks, still maintained upright, and closely embraced by the belts, travel to the rear of the celery passage and fall clear of the harvester.

While I have in the above description disclosed what I believe to be a preferred and practical embodiment of the invention, it will be understood to those skilled in the art that the details of construction and the arrangement of parts, as described, are by way of illustration and not to be construed as limiting the scope of the invention.

What I claim as my invention is:

1. Celery harvester comprising a vehicle frame supported on vehicle wheels adapted to be drawn astride a row of standing celery longitudinally thereof, and a harvester unit beneath said frame including a sub-frame and the following instrumentalities carried thereby: laterally spaced longitudinally disposed members relatively rearwardly convergent at their forward ends, defining between them a celery passage, top cutting means at an intermediate point in the length of said passage at a relatively high level, and root cutting means rearwardly of said top cutting means at a relatively low level, said top and root cutting means being in the path of celery moving rearwardly through said passage; means between said vehicle and sub-frames for raising and lowering said sub-frame bodily relative to said vehicle frame, without tilting it, for adjusting the ground depth of said root cutting means without changing the relative position of said instrumentalities, power means on said vehicle frame and driving connections from said power means to said raising and lowering means and to said top and root cutting means, the driving connections to said top and root cutting means including means for compensating for variations in the distance of said sub-frame from said vehicle frame.

2. Celery harvester comprising a vehicle frame supported on vehicle wheels adapted to be drawn astride a row of standing celery longitudinally thereof, and a harvester unit beneath said frame including a sub-frame and the following instrumentalities carried thereby: laterally spaced longitudinally disposed belts having their inner flights relatively convergent at their forward ends, defining between them a celery passage, top cutting disks at an intermediate point in the length of said passage at a relatively high level and root cutting disks rearward of said top cutting disks at a relatively low level, said top and root cutting disks being in the path of celery moving rearwardly through said passage; power means on said vehicle frame and driving means connecting said power means to said several instrumentalities for driving said belts in a direction to move their inner flights rearwardly, to drive said top cutting disks in a direction to rotate their leading edges toward one another and to drive said root cutting disks in a direction to move their leading edges away from one another, and means for raising and lowering said harvester unit bodily relative to said vehicle frame without tilting said harvester unit for adjusting the ground depth of said root cutting means without changing the relative positions of said instrumentalities, said driving means including means for compensating for variations in the distance of said harvester unit from said vehicle frame.

3. Celery harvester comprising a tractor adapted to be driven astride a row of celery longitudinally thereof, and a harvester unit beneath said tractor including a frame and the following instrumentalities carried thereby: laterally spaced longitudinally disposed members relatively rearwardly convergent at their forward ends, defining between them a celery passage, top cutting means at an intermediate point in the length of said passage at a relatively high level and root cutting means rearwardly of said top cutting means at a relatively low level, said top and root cutting means being in the path of celery moving through said passage; means for driving said top and root cutting means from the power plant of said tractor, and means for raising and lowering said frame bodily relative to said tractor for adjusting the ground depth of said root cutting means without changing the relative positions of said instrumentalities, said driving means including means for compensating for variations in the distance of said harvester unit from said vehicle frame.

4. Celery harvester comprising a tractor adapted to be driven astride a row of standing celery longitudinally thereof and a harvester unit beneath said tractor including a frame and the following instrumentalities carried thereby: laterally spaced longitudinally disposed belts having their inner flights relatively convergent at their forward ends, defining between them a celery passage, top cutting disks at an intermediate point in the length of said passage at a relatively high level, and root cutting disks rearward of said top cutting disks at a relatively low level, said top cutting and root cutting disks being in the path of celery moving rearwardly through said passage; driving means from the power plant of said tractor connected to said instrumentalities to drive said belts in a direction to move their inner flights rearwardly, to drive said top cutting disks in a direction to rotate their leading edges toward one another, and to drive said root cutting disks in a direction to move their leading edges away from one another, and means for raising and lowering said harvester unit bodily relative to said tractor for adjusting the ground depth of said root cutting disks without changing the relative positions of said instrumentalities, said driving means including means for compensating for variations in the distance of said harvester unit from said vehicle frame.

5. Celery harvester comprising a frame having a pair of laterally spaced pulley supports hingedly mounted at its rear, swingable about parallel upright axes, a rearward pulley carried by each support, a pair of laterally positioned forward pulleys widely spaced apart carried by the forward part of said frame, and a pair of intermediate laterally positioned pulleys carried by said frame narrowly spaced apart, the axes of all said pulleys being parallel to the axis of swing of said pulley supports, a pair of longitudinally extending laterally spaced belts passing around said forward and corresponding rearward pulleys having their inner flights passing between said intermediate pulleys, said inner flights defining a celery passage open at the bottom and ends, rearwardly convergent at its forward end, adapted to operate astride a row of standing celery as said frame is drawn forwardly at such height as to cause said inner flights to engage the bushy part of said celery, said intermediate pulleys and said pulley supports being laterally adjustable to vary the width of said celery passage between said intermediate and rearward pulleys, top cutting means at an intermediate point in the length of said celery passage at a relatively high level and root cutting means rearward of said top cutting means at a relatively low level, said top and root cutting means being in the path of celery moving through said passage, means for driving a pulley engageable with each of said belts in a direction to cause the inner flights of said belts to travel rearwardly and means for driving said top cutting and root cutting means.

6. Celery harvester comprising a frame adapted to be supported above celery level and drawn longitudinally above a row of celery, comprising laterally spaced belts mounted on pulleys depending from said frame, so positioned as to arrange the inner flights of said belts to form a longitudinal celery passage rearwardly convergent at its forward end and at such height to engage the bushy part of the celery, one of the pulleys for each belt being driven to drive said belts in a direction to move their adjacent flights rearwardly, cooperating top cutting disks carried beneath said frame adjacent the convergent end of the forward part of said celery passage, laterally spaced struts rigid with said frame extending downward outside the inner flights of said belts, cooperating root cutting disks journaled in the lower ends of said struts having their cutting edges operating below ground level at a point rearwardly of said top cutting disks, and means for driving said top cutting disks in a direction to rotate their leading edges toward one another, and said root cutting disks in a direction to rotate their leading edges away from one another.

7. Celery harvester comprising a frame having a pair of laterally spaced pulley supports hingedly mounted at its rear, swingable about parallel upright axes, a rearward pulley carried by each support, a pair of laterally positioned forward pulleys widely spaced apart carried by the forward part of said frame and a pair of intermediate laterally positioned pulley units carried by said frame, the inner pulleys of said units being narrowly spaced apart, the axes of all of said pulleys being parallel to the axis of swing of said pulley supports, a pair of longitudinally extending laterally spaced belts passing around said forward and corresponding rearward pulleys having their inner flights passing between the inner pulleys of said intermediate units and bearing thereagainst and their outer flights passing between the inner and outer pulleys of said units and bearing against the outer pulleys of said units, said inner flights defining a celery passage open at the bottom and ends, rearwardly convergent at its forward end, adapted to operate astride a row of standing celery as said frame is drawn forwardly at such height as to cause said inner flights to engage the bushy part of said celery, said intermediate pulley units and said pulley supports being laterally adjustable to vary the width of said celery passage between said intermediate and rearward pulleys, top cutting means at an intermediate point in the length of said celery passage at a relatively high level and root cutting means rearward of said top cutting means at a relatively low level, said top and root cutting means being in the path of celery moving through said passage, means for driving a pulley engageable with each of said belts, in a direction to cause the inner flights of said belts to travel rearwardly and means for driving said top cutting and root cutting means.

8. Celery harvester comprising a frame adapted to be supported above celery level and drawn longitudinally above a row of celery, comprising laterally spaced belts mounted on a pulley system depending from said frame, the pulleys of said system being so positioned as to arrange the inner flights of said belts to form a longitudinal celery passage rearwardly convergent at its forward end and at such height to engage the bushy part of the celery, one of the pulleys for each belt being driven to drive said belts in a direction to move their adjacent flights rearwardly, laterally spaced struts rigid with said frame extending downwardly outside the inner flights of said belts, a pair of laterally spaced U-shaped pulley supports pivotally mounted at the rear of said frame and at the lower ends of said struts to swing laterally, the rear pulleys of said system being journaled in the upper and lower limbs of said supports, means for adjusting said supports, cooperating top cutting disks carried beneath said frame adjacent the convergent end of the forward part of said celery passage, cooperating root cutting disks journaled in the lower ends of said struts having their cutting edges operating below ground level at a point rearwardly of said top cutting disks, and means for driving said top cutting and root cutting disks.

WILLARD C. SILVA.

No references cited.